United States Patent [19]

Schäfer et al.

[11] Patent Number: 4,602,055

[45] Date of Patent: Jul. 22, 1986

[54] PROCESS FOR PAD DYEING CELLULOSIC TEXTILE MATERIALS

[75] Inventors: Paul Schäfer, Riehen; Hans-Ulrich Berendt, Allschwil, both of Switzerland

[73] Assignee: Ciba-Geigy Corporation, Ardsley, N.Y.

[21] Appl. No.: 617,443

[22] Filed: Jun. 4, 1984

Related U.S. Application Data

[62] Division of Ser. No. 559,121, Dec. 7, 1983, Pat. No. 4,494,956.

[30] Foreign Application Priority Data

Dec. 14, 1982 [CH] Switzerland .......................... 7268/82
Oct. 6, 1983 [CH] Switzerland .......................... 5431/83

[51] Int. Cl.⁴ .................... C08G 65/08; C08K 5/42; C08L 71/02
[52] U.S. Cl. .................... 524/157; 524/317; 524/366; 524/369; 525/409; 525/530; 525/532
[58] Field of Search ............. 525/530, 532, 409, 187; 524/157, 317, 366, 369

[56] References Cited

U.S. PATENT DOCUMENTS

| | | | |
|---|---|---|---|
| 3,676,529 | 7/1972 | Fall | 525/409 |
| 3,763,277 | 10/1973 | Chu et al. | 525/409 |
| 4,028,434 | 6/1977 | Konter et al. | 525/532 |
| 4,304,567 | 12/1981 | Ballman et al. | 8/543 |
| 4,321,342 | 3/1982 | Davis et al. | 525/530 |
| 4,389,214 | 6/1983 | Schafer et al. | 8/527 |

*Primary Examiner*—Allan M. Lieberman
*Attorney, Agent, or Firm*—Edward McC. Roberts; Meredith C. Findlay; Kevin T. Mansfield

[57] ABSTRACT

Cellulosic textile material is dyed with substantive dyes or preferably with reactive dyes. Dyeing is carried out by applying to the cellulosic material an aqueous dye liquor which contains, in addition to the dye, a graft polymer which is obtained from an adduct of an alkylene oxide, preferably propylene oxide, with an at least trihydric aliphatic alcohol, e.g. glycerol, and acrylamide or methacrylamide. The cellulosic material is then subjected to a heat treatment, e.g. by steaming or with microwaves, or is stored cold, to fix the dyes.

This dye liquor increases the liquor pick-up and thus also increases the dye yield, while at the same time excellent levelness is achieved.

9 Claims, No Drawings

PROCESS FOR PAD DYEING CELLULOSIC TEXTILE MATERIALS

This application is a division of application Ser. No. 559,121, now U.S. Pat. No. 4,494,956, issued Jan. 22, 1985.

The present invention relates to a process for pad dyeing textile materials which consist wholly or partly of cellulose fibres with substantive dyes or, preferably, with reactive dyes.

The process of this invention comprises padding the cellulosic materials with aqueous dye liquors which, in addition to containing the dyes, contain graft polymers of an adduct of an alkylene oxide and an at least trihydric aliphatic alcohol containing 3 to 10 carbon atoms and methacrylamide or preferably acrylamide, and subsequently carrying out the fixation of the dyes by a heat treatment or by the cold pad-batch process.

Preferred graft polymers are those obtained by graft polymerisation of methacrylamide or, preferably, acrylamide to an adduct of 4 to 100 moles, preferably 40 to 80 moles, of propylene oxide with trihydric to hexahydric alkanols of 3 to 6 carbon atoms. These alkanols can be straight chain or branched. Representative examples are glycerol, trimethylolethane, trimethylolpropane, erythritol, pentaerythritol, mannitol or sorbitol.

Further suitable graft polymers are those obtained by grafting methylacrylamide or acrylamide to adducts of mixtures of ethylene oxide or propylene oxide or also of ethylene oxide alone to the above mentioned polyhydric alcohols. Particularly suitable graft polymers are those of acrylamide and adducts of 40 to 80 moles of propylene oxide with 1 mole of glycerol.

The graft polymers employed in the practice of this invention advantageously contain 2.5 to 50% by weight of the defined adduct as main chain and 50 to 97.5% by weight of grafted acrylamide or methacrylamide as side chains.

The graft polymers advantageously contain 2.5 to 30% by weight of the alkylene oxide adduct and 70 to 97.5% by weight of methacrylamide or, preferably, acrylamide. Preferably, the amide component is 80 to 97.5% or more preferably 90 to 97.5% by weight, based on the graft polymer.

Those products are particularly preferred which contain, as main chain, 4 to 10% by weight of the adduct of 40 to 80 moles of propylene oxide with 1 mole of glycerol and 90 to 96% by weight of acrylamide.

The percentages are based on the entire graft polymer.

The graft polymers of this invention are prepared by methods which are known per se, conveniently by polymerising (1) an adduct of an alkylene oxide and an at least trihydric aliphatic alcohol of 3 to 10 carbon atoms with (2) acrylamide or methacrylamide, and in the presence of a catalyst, preferably in the temperature range from 40° to 100° C. There are thus obtained substantially graft polymers in which the alkylene oxide adduct forms the main chain which, at individual carbon atoms, contains the grafted acrylamide or methacrylamide in the form of side chains.

The catalysts employed are advantageously organic or preferably inorganic initiators which form free radicals. Suitable organic initiators for carrying out the radical polymerisation are e.g. symmetrical peroxide dicarbonates, butyl peroctoates, butyl perbenzoates, peracetates or peroxide dicarbamates. Suitable inorganic initiators are hydrogen peroxide, perborates, persulfates or peroxydisulfates. The preferred initiator or activator is potassium peroxydisulfate ($K_2S_2O_8$).

These catalysts can be used in amounts of 0.05 to 5% by weight, advantageously of 0.05 to 2% by weight and, most preferably, of 0.1 to 1% by weight, based on the starting materials.

The graft polymerisation is conveniently carried out in an inert atmosphere, e.g. in the presence of nitrogen.

The graft polmers are advantageously obtained in the form of highly viscous solutions. Gel-like products having a solids content of e.g. 0.5 to 20% by weight, preferably 2 to 20% by weight, can be prepared by dissolving these polymers in, and diluting them with, water. To preserve the aqueous solutions of the graft polymers and/or to improve their storage stability, it is possible to add preservatives such as chloroacetamide, N-hydroxymethylchloroacetamide, pentachlorophenolates, alkali metal nitrites, triethanolamine or, preferably, hydroquinone monomethyl ether, or also bactericides such as sodium azide or surface-active quaternary ammonium compounds which contain one or two fatty alkyl radicals. It is also advantageous to use mixtures of these preservatives and antimicrobial compounds.

The particularly preferred 2 or 3 to 5% solutions of the graft polymers have a viscosity of 3000 to 150,000 mPas, preferably of 15,000 to 120,000 mPas and, most preferably, of 40,000 to 80,000 mPas (milli-Pascal seconds). The polyalkylene oxide adducts employed to prepare the graft polymers normally have a molecular weight of 400 to 6000, preferably 3000 to 4500.

The amount in which the graft polymers are used in the dye liquors can vary within wide limits. Amounts of 3 to 40 g, preferably 5 to 40 g and, most preferably, 8 to 20 g per liter of dye liquor, in the form of 3 to 10% aqueous solutions, have proved advantageous.

The process of this invention is suitable for dyeing textiles which consist of or contain cellulose. After they have been padded, the cellulosic materials are subjected to a heat treatment to fix the dyes. Dye fixation can also conveniently be carried out by the cold pad-batch method.

The thermofixation can be effected by a steaming, hot dwell, thermosol or preferably by a microwave process.

In the steaming process, the dyes are fixed by subjecting the textile materials padded with the dye liquor to a treatment with steam or superheated steam in a steamer, conveniently in the temperature range from 98° to 130° C., preferably from 102° to 110° C.

In the hot dwell process, the padded goods are stored in the moist state for e.g. 15 to 120 minutes, preferably in the temperature range from 85° to 102° C. In this process, the goods can be preheated to 85°–102° C. by infrared irradiation. The preferred dwell temperature is from 95°–100° C.

Dye fixation by means of the thermosol process can be effected after, or without, an intermediate drying, e.g. at a temperature in the range from 100° to 210° C. It is preferred to carry out the thermosol process in the temperature range from 120° C. to 210° C., preferably from 140° to 180° C., and after the goods have been subjected to an intermediate drying at a temperature range of 80° to 120° C. Depending on the temperature, the thermosol fixation can take from 20 seconds to 5 minutes, preferably from 30 to 60 seconds.

It is preferred to thermofix the dyes by means of microwaves. This is conveniently done by rolling up the goods after impregnation with the dye liquor and pinching off the excess liquor, and then exposing them to microwaves in a chamber.

The microwave treatment can take from 2 to 120 minutes; but a treatment from 2 to 15 minutes is preferred. Microwaves are defined as electromagnetic waves (radio waves) in the frequency range from 300 to 100,000 MHz, preferably from 1000 to 30,000 MHz.

Dye fixation can also be effected by the cold pad-batch method by storing the padded goods, preferably rolled up, at room temperature (15°–30° C.), e.g. for 3 to 24 hours. The cold dwell time is, of course, dependent on the dye employed. If desired, the goods can also be stored at slightly elevated temperature (30°–80° C.).

Suitable cellulosic material is that made of regenerated or, in particular, of natural cellulose, e.g. viscose staple fibre, viscose rayon, hemp, linen, jute, or preferably cotton, as well as fibre blends, e.g. polyamide/cotton blends or, preferably, polyester/cotton blends, the polyester component of which can be dyed with disperse dyes beforehand, simultaneously or subsequently.

The cellulosic material can be in the most diverse states of processing, but is preferably in the form of woven or knitted goods, e.g. tubular knitted fabrics. Both untreated and pretreated materials can be used.

The dyes employed in the process of this invention are the substantive dyes or, in particular, reactive dyes conventionally employed for dyeing cellulosic materials.

Suitable substantive dyes are the conventional direct dyes, for example those listed under the heading "Direct Dyes" in the Colour Index, 3rd edition (1971), Vol. 2, on pages 2005–2478.

By reactive dyes are meant the conventional dyes which form a covalent bond with cellulose, e.g. those listed under the heading "Reactive Dyes" in the Colour Index, Vol. 3, 3rd. edition (1971), on pages 3391–3560, and in Vol. 6, revised 3rd edition (1975), on pages 6268–6345.

The amount of dye in the dye liquor will normally depend on the desired colour strength and is conveniently 0.1 to 100 g/l preferably 5 to 60 g/l.

Representative examples of the alkalies employed for fixing the reactive dyes are sodium carbonate, sodium bicarbonate, sodium hydroxide, disodium phosphate, trisodium phosphate, borax, aqueous ammonia, or alkali donors such as sodium trichloroacetate. A very suitable alkali is in particular a mixture of water glass and a 30% aqueous sodium hydroxide solution. The pH of the alkaline dye liquors is generally from 7.5 to 13.2, preferably from 8.5 to 11.5.

The padding liquors are conveniently prepared by dissolving the dye and adding the graft polymer and alkali. Depending on the dye employed, the dye liquors can contain conventional additives, e.g. electrolytes such as sodium chloride or sodium sulfate, as well as urea, glycerol and/or sodium formate. If desired, thickeners such as alginates, starch ethers or carob bean gum can also be added to the dye liquors.

Besides the graft polymers, it is often advantageous to add commercially available alkali-resistant wetting agents to the padding liquors, e.g. sulfonates of polycarboxylic acid esters such as dihexylsulfosuccinates or dioctylsulfosuccinates; alkylarylsulfonates with linear or branched alkyl chain containing at least 6 carbon atoms, e.g. dodecylbenzenesulfonates, or preferably alkylsulfonates containing 8 to 20 carbon atoms in the alkyl chain, e.g. dodecylsulfonates or pentadecylsulfonates. The sulfonates suitable as wetting agents are usually in the form of alkali metal salts, preferably of sodium or ammonium salts.

The amounts in which the wetting agents are added to the padding liquors preferably vary from 1 to 10 g/l, preferably from 1.5 to 5 g/l.

An advantageous embodiment of the process of this invention comprises impregnating the cellulosic material with a dye liquor which contains the graft polymer in combination with a wetting agent consisting of (A) an alkylsulfonate which contains 8 to 20 carbon atoms in the alkyl chain, and (B) an adduct of 2 to 40 moles of ethylene oxide with 1 mole of a fatty alcohol or fatty acid, each containing 8 to 22 carbon atoms, or with 1 mole of an alkylphenol containing a total of 4 to 12 carbon atoms in the alkyl moiety. The ratio of component (A) to component (B) is normally from 5:1 to 1:1, preferably from 5:1 to 2:1 and, most preferably, from 4:1 to 3:1.

Preferred ethylene oxide adducts (B) are those which are obtained by addition of 2 to 10 moles of ethylene oxide to 1 mole of a $C_8$-$C_{12}$ fatty alcohol.

The above combination can also be used in the form of an aqueous formulation. This formulation can be obtained by simply stirring an aqueous solution of the gel-like graft polymer with components (A) and (B). The formulations are obtained as homogeneous mixtures by addition of water and, if desired, a solution of sodium chloride, and of a silicone oil and/or a silicone surfactant.

The aqueous formulations contain with advantage at least 1 to 10% by weight of the graft polymer,
8 to 25% by weight of the alkylsulfonate (A),
3 to 10% by weight of the ethylene oxide adduct (B),
65 to 88% of water, and
0 to 3% by weight of further assistants,
the amounts being based in each case on the aqueous formulation.

The amounts in which these aqueous formulations can be added to the padding liquors vary preferably from 10 to 30 g/l.

Following the dyeing process, the dyed cellulosic material can be given a washing off in conventional manner to remove non-fixed dye. This is done by treating the substrate, e.g. at 40° C. to boiling temperature, in a solution which contains soap or a synthetic detergent. Treatment with a fixing agent can subsequently be effected to improve the wetfastness properties.

An increase in dye liquor absorption of up to 40%, and consequently also an increase in dye yield, is obtained with the process of this invention. Substantially better dye yields are obtained even with the addition of small amounts of the graft polymers employed in the process of this invention.

Compared with the prior art acrylamide homopolymers or copolymers of acrylamide with the further ethylenically unsaturated polymerisable monomers described e.g. in DE-OS No. 2 918 607, high dye yields are obtained with the process of this invention using smaller amounts of graft polymers. In addition, level and strong dyeings are obtained. Further, the fastness properties of the dyeings, e.g. lightfastness, rubfastness and wetfastness, are not adversely affected by the use of the graft polymers.

In the following Preparatory and Use Examples, percentages are by weight, unless otherwise stated. The amounts of dye refer to commercially available, i.e. diluted, product, and the amounts of assistants to pure substance. The five-figure Colour Index (C.I.) numbers relate to the 3rd. edition of the Colour Index.

PREPARATORY EXAMPLES

Example 1

With stirring and under a stream of nitrogen, a solution of 22.5 g of acrylamide, 2.5 g of an adduct of 52 moles of propylene oxide with 1 mole of glycerol, and 0.04 g of potassium peroxydisulfate in 200 g of water is heated to 50° C. and kept at this temperature for 3 hours. Then a solution of 0.03 g of potassium peroxydisulfate in 40 g of water is added dropwise over 60 minutes and the highly viscous solution is diluted with 300 ml of water over 30 minutes. The reaction mixture is then kept for 5 hours at 50° C. and, after addition of 0.6 g of hydroquinone monomethyl ether and 0.12 g of sodium azide, cooled to room temperature with stirring, affording 565 g of a gel with a polymer content of 4.4%. This gel has a viscosity of 112957 mPas, measured at 25° C.

Example 2

With stirring and under a stream of nitrogen, a solution of 71.25 g of acrylamide, 3.75 g of an adduct of propylene oxide and glycerol with an average molecular weight of 4200, and 0.09 g of potassium peroxydisulfate in 600 g of water is heated to 50° C. and kept at this temperature for 3 hours. The viscosity of the solution gradually increases. Then a solution of 0.06 g of potassium peroxydisulfate in 120 g of water is added dropwise over 60 minutes. About 10 minutes after the start of the dropwise addition, the viscosity of the solution becomes so great that 600 g of water have to be added over the next 20 minutes. When the addition of potassium peroxydisulfate solution is complete, the increasingly viscous solution is kept for a further 5 hours at 50° C., while diluting it with an additional 400 g of water in portions. Then 1.7 g of hydroquinone monomethyl ether are added and the reaction mixture is cooled, with stirring, to room temperature, affording 1794 g of a free flowing gel with a polymer content of 4.3%. This gel has a viscosity of 64202 mPas, measured at 25° C.

Example 3

With stirring and under a stream of nitrogen, a solution of 71.25 g of acrylamide, 3.75 g of an adduct of propylene oxide and pentaerythritol with an average molecular weight of 3550, and 0.09 g of potassium peroxydisulfate in 600 g of water is heated to 50° C. and kept at this temperature for 3 hours. The viscosity of the solution gradually increases. Then a solution of 0.06 g of potassium peroxydisulfate in 120 g of water is added dropwise over 60 minutes. About 30 minutes after completion of the dropwise addition, the viscosity of the solution increases and 600 g of water are added over the next 20 minutes. The increasingly more viscous solution is then kept for a further 4 hours at 50° C. and subsequently diluted with an additional 400 g of water. After addition of 3.4 g of triethanolamine, the mixture is cooled to room temperature, affording 1793 g of a still fluid gel with a solids content of 4.0%. This gel has a viscosity of 75300 mPas, measured at 25° C.

Example 4

With stirring and under a stream of nitrogen, a solution of 17.8 g of acrylamide, 0.94 g of an adduct of 70 moles of propylene oxide and 6 moles of ethylene oxide with 1 mole of glycerol, and 0.025 g of potassium peroxydisulfate in 250 g of water is heated to 55° C. and kept for 3 hours at this temperature. The temperature of the solution is increased to 60°–63° C. over 20 minutes until the viscosity markedly increases, and the solution is then cooled to 55° C. The increasingly more viscous solution is kept for 5 hours at 55° C. Then a solution of 0.45 g of chloroacetamide and 0.45 g of hydroquinone monomethyl ether in 177 g of water is added to the viscous solution, affording 446 g of a gel with a graft polymer content of 4.2%. This gel has a viscosity of 96750 mPas, measured at 25° C.

Example 5

If the adduct used in Example 4 is replaced by a further adduct of 53 moles of propylene oxide with 1 mole of trimethylolpropane, there are obtained 446 g of a gel with a graft polymer content of 4.2%. This gel has a viscosity of 19500 mPas, measured at 25° C.

Example 6

With stirring and under a stream of nitrogen, a solution of 17.24 g of acrylamide, 4.31 g of an adduct of 70 moles of propylene oxide with 1 mole of glycerol, and 0.035 g of potassium peroxydisulfate in 200 g of water is heated to 50° C. and kept at this temperature for 4 hours. The increasingly more viscous solution is then heated for 5 hours to 55° C. To the resultant gel is added a solution of 0.4 g of chloroacetamide and 0.4 g of hydroquinone monomethyl ether in 291 g of water, affording 513 g of a gel with a polymer content of 4.2%. This gel has a viscosity of 25750 mPas, measured at 25° C.

Example 7

With stirring and under a stream of nitrogen, a mixture of 15.1 g of acrylamide, 6.5 g of an adduct of 70 moles of propylene oxide with 1 mole of glycerol, and 0.025 g of potassium peroxydisulfate in 200 g of water is heated to 50° C. and kept for 3 hours at this temperature. The increasingly more viscous solution is heated to 55° C. for 5 hours. To the resultant gel is added a solution of 0.4 g of chloroacetamide and 0.4 g of hydroquinone monomethyl ether in 291 g of water, affording 512 g of a gel with a polymer content of 4.2%. This gel has a viscosity of 16300 mPas, measured at 25° C.

Example 8

With stirring and under a stream of nitrogen, a mixture of 13 g of acrylamide, 8.7 g of an adduct of 70 moles of propylene oxide with 1 mole of glycerol, and 0.015 g of potassium peroxydisulfate in 150 g of water is heated to 50° C. and kept at this temperature for 4 hours. The increasingly more viscous solution is then heated for 2 hours to 65° C. and for a further 3 hours to 60° C. To the resultant gel is added a solution of 94 g of chloroacetamide and 0.4 g of hydroquinone monomethyl ether in 347 g of water, affording 519 g of a gel with a polymer content of 4.2%. This gel has a viscosity of 15582 mPas, measured at 25° C.

USE EXAMPLES

Example 1

An untreated cotton knitted fabric with a mass per unit area of 165 g/m² is impregnated on a padder at 25° C. to a pick-up of 107% (based on the dry weight of the substrate) with a liquor which contains, per liter, 50 g of the dye of the formula

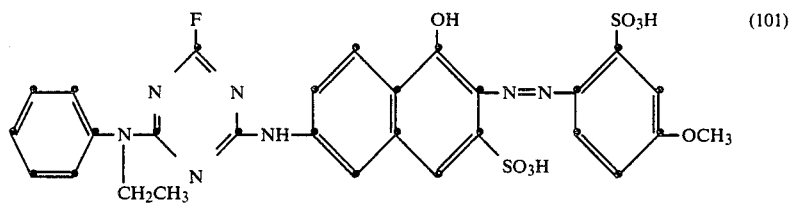

(101)

2.5 g of a wetting agent consisting of pentadecane-1-sulfonic acid, sodium salt, and the adduct of 4 moles of ethylene oxide with 1 mole of a $C_9$–$C_{11}$ primary alcohol in the weight ratio of 3:1,
10 ml of a graft polymer prepared according to Preparatory Example 2,
10 ml of 30% sodium hydroxide solution and
75 ml of sodium silicate solution (silicate content: 26.3–27.7%).

The immersion time is 0.86 seconds and the roller pressure 1.5 bar/cm². The fabric is then rolled up and stored for 6 hours at 25° C. The fabric is then rinsed and washed for 20 minutes at boiling temperature with a non-ionic detergent (0.5 g/l of the adduct of 9 moles of ethylene oxide with 1 mole of nonylphenol) in a liquor ratio of 1:40. The substrate is subsequently rinsed again and dried. The strong and brilliant red dyeing obtained is distinguished by a particularly level appearance.

Example 2

An untreated cotton knitted fabric (mass per unit area 165 g/m²) is impregnated on a padder at 25° C. to a pick-up of 110% (based on the dry weight of the substrate) with a liquor which contains, per liter,
50 g of the the dye of the formula 100 g of urea.

The immersion time is 0.86 seconds and the roller pressure 1.5 bar/cm². The goods are then stored for 16 hours at 25° C., rinsed warm (40° C.) and cold, subjected to an aftertreatment in conventional manner with a cationic assistant to improve the wetfastness properties, rinsed again and dried.

The strong red dyeing so obtained is distinguished by a level appearance. Compared with a dyeing obtained by a conventional method, the dyeing obtained in this Example exhibits a 30% increase in dye yield.

Example 4

A bleached cotton cord velvet fabric (350 g/m²) is impregnated on a padder at 25° C. to a pick-up of 95% (based on the weight of the dry substrate) with a liquor which contains, per liter,
40 g of the dye of the formula (101),
1 g of an aqueous wetting agent containing 23% by weight of an alkylbenzenesulfonate, e.g. dodecylbenzenesulfonate (sodium salt), 8% by weight of an alkylsulfonate, e.g. pentadecyl or dodecylsulfonate (sodium salt) and 16% by weight of a $C_{12}$–$C_4$ fatty alcohol polyglycol ether,
100 g of urea,

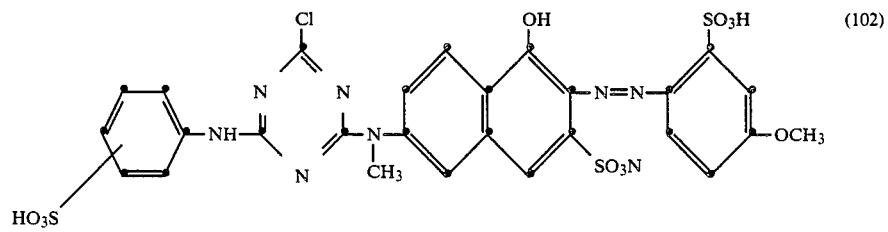

(102)

2.5 g of the wetting agent employed in Example 1,
10 ml of the graft polymer prepared according to Preparatory Example 2,
92 ml of 30% sodium hydroxide solution and
100 ml of sodium silicate solution.

The impregnated fabric is then rolled up and stored for 18 hours at 25° C. The dyeing is then finished as described in Example 1. The strong and brilliant red dyeing obtained is distinguished by good penetration of the dye and a very level appearance.

Example 3

An untreated knitted cotton fabric (mass per unit area 165 g/m²) is impregnated on a padder at 40° C. to a pick-up of 109% (based on the dry weight of the substrate) with a liquor which contains, per liter,
20 g of the direct dye Direct Red 80 C.I. No. 35780,
5 g of the wetting agent employed in Example 1,
20 g of the graft polymer prepared according to Preparatory Example 2, and 20 g of the graft polymer prepared according to Preparatory Example 2,
20 g of anhydrous sodium carbonate and
2 g of sodium m-nitrobenzenesulfonate.

The immersion time is 0.86 seconds and the roller pressure 2 bar/cm². The goods are then steamed for 3 minutes at 102° C., then rinsed and washed for 20 minutes at boiling temperature with a non-ionic detergent (0.5 g/l of the adduct of 9 moles of ethylene oxide with 1 mole of nonylphenol) in a liquor ratio of 1:40. The goods are subsequently rinsed again and dried. The strong and brilliant red dyeing so obtained has a level appearance.

Example 5

A bleached cotton cord velvet fabric (350 g/m²) is impregnated on a padder at 25° C. to a pick-up of 90% (based on the dry weight of the substrate) with a liquor which contains, per liter,
20 g of the dye of the formula

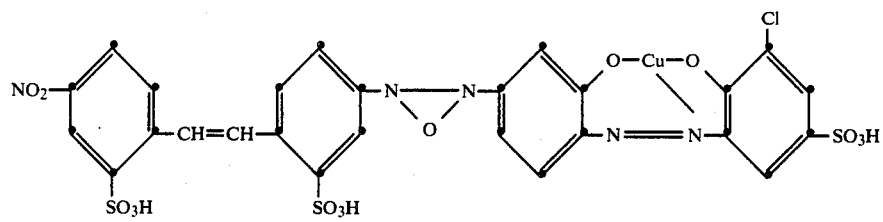

(103)

1 g of the wetting agent employed in Example 4,
100 g of urea and
20 g of the graft polymer prepared according to Example 2.

The rate of passage is 2 m/min and the roller pressure is 2 bar/cm². The fabric is then steamed for 3 minutes at 102° C., then rinsed warm (40° C.) and cold and subjected to an aftertreatment with a cationic fixing agent to improve the wetfastness properties.

The dark brown dyeing so obtained has good fastness properties and a level appearance.

Example 6

An untreated cotton knitted fabric (165 g/m²) is impregnated on a padder at 25° C. to a pick-up of 104% (based on the dry weight of the substrate) with a liquor which, contains, per liter,
20 g of the dye of the formula

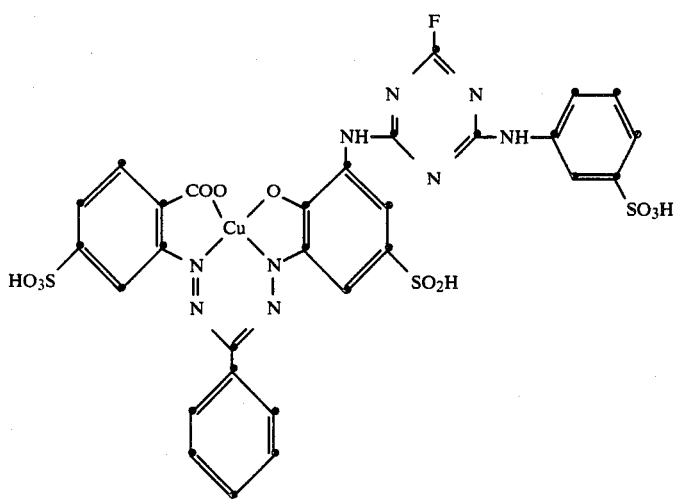

(104)

100 g of urea,
50 g of sodium sulfate,
20 g of the graft polymer obtained according to Preparatory Example 1,
5 g of sodium m-nitrobenzenesulfonate,
2.5 g of an aqueous wetting agent containing 43% of the sodium salt of pentadecane-1-sulfonic acid, 14% of a C9-C11 fatty alcohol polyglycol ether, and 5% of 2-ethylhexanol, and
20 g of sodium carbonate.

The goods are then steamed for 90 seconds at 102° C., then rinsed and washed as described in Example 1, rinsed again and subsequently dried. The strong blue dyeing so obtained is distinguished by good penetration of the dye and a level appearance.

A comparably good dyeing is obtained by using the same amount of the graft polymer obtained according to Preparatory Example 3 instead of the graft polymer of Example 1.

Example 7

An untreated cotton knitted fabric is impregnated to a pick-up of 104% (based on the dry weight of the substrate) with a warm aqueous liquor of 30° C. which contains, per liter,
50 g of the dye of the formula (102),
20 g of the graft polymer obtained according to Preparatory Example 4,
5 g of the wetting agent employed in Example 6,
92 ml of 30% sodium hydroxide solution and
100 ml of sodium silicate solution.

The goods are then steamed in a steamer for 90 seconds at 102° C., rinsed, washed hot and rinsed again. The powerful red dyeing so obtained has an exceptionally level appearance.

Comparably good effects are obtained by using the same amount of the graft polymer obtained in Preparatory Example 5 instead of that obtained in Example 4.

Example 8

An untreated cotton knitted fabric with a mass per unit area of 165 g/m² is impregnated on a padder at 25° C. to a pick-up of 128% (based on the dry weight of the substrate) with a liquor which contains, per liter,
50 g of the dye of the formula (101),
2.5 g of a wetting agent consisting of the sodium salt of pentadecane-1-sulfonic acid and the adduct of 4 moles of ethylene oxide with 1 mole of a C9-C11 primary alcohol in the weight ratio of 3:1,
10 ml of a graft polymer obtained according to Preparatory Example 2,
10 ml of 30% sodium hydroxide and
75 ml of sodium silicate solution (silicate content: 26.3–27.7%).

The immersion time is 0.86 seconds and the roller pressure is 1.5 bar/cm². The goods are then rolled up and wrapped in plastic sheeting and treated for 3 minutes with microwaves at a frequency of 2450 MHz. The goods are then rinsed and washed for 20 minutes at boiling temperature with a non-ionic detergent (0.5 g/l of the adduct of 9 moles of ethylene oxide with 1 mole of nonylphenol) in a liquor ratio of 1:40. The substrate is then rinsed again and dried. A strong and brilliant red dyeing of good levelness is obtained.

Comparably good dyeings are obtained by using equal amounts of the graft polymers obtained in Preparatory Examples 1 and 3 to 8 instead of the graft polymer obtained in Example 2.

Example 9

An untreated sized cotton fabric with a mass per unit area of 208 g/m² is impregnated on a padder at 25° C. to a pick-up of 119% (based on the dry weight of the substrate) with a liquor which contains, per liter, 35 g of the dye of the formula

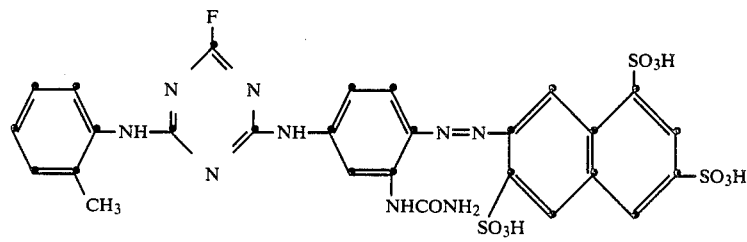

(105)

15 g of the dye of the formula (104),
5 g of the wetting agent employed in Example 1,
20 g of the graft polymer obtained according to Preparatory Example 2,
200 g of urea,
15 g of sodium bicarbonate and
5 g of sodium m-nitrobenzenesulfonate.

The goods are subsequently dried at 100° C. and then treated for 40 seconds at 180° C. to fix the dye. The dyeing is then finished as described in Example 1. The green dying so obtained has good penetration of the dye and a level appearance.

A comparably good dyeing is obtained by using the same amount of the graft polymer obtained in Preparatory Example 7 instead of that obtained in Example 2.

Example 10

An untreated cotton knitted fabric (165 g/m²) is impregnated on a padder at 25° C. to a pick-up of 67% with a liquor which contains, per liter,
1 g of the dye of the formula (104),
5 g of the wetting agent employed in Example 1,
15 ml of 30% sodium hydroxide solution, and
75 ml of sodium silicate solution (silicate content: 26.3–27.7%).

The roller pressure is 2 bar/cm². The fabric is then rolled up and stored for 6 hours at 25° C. Without an intermediate drying, the dyed goods are then impregnated again on a padder to a pick-up of 125% with a liquor which contains, per liter,
5 g of the above wetting agent,
20 g of the graft polymer obtained in Preparatory Example 2,
50 ml of 30% sodium hydroxide,
10 g of the magnesium salt of diethylenetriaminepentaacetic acid and
50 ml of a 35% aqueous solution of hydrogen peroxide.

The roller pressure is 2 bar/cm². The goods are then rolled up once more and stored for 15 hours at 25° C. The dyed goods are then rinsed and finished in the usual manner. A good bleaching effect and a brilliant blue dyeing are obtained. With this wet-in-wet process the liquor pick-up necessary for the bleaching procedure is ensured by the addition of the graft polymer obtaind according to Preparatory Example 2, without an intermediate drying.

What is claimed is:

1. A graft polymer comprising: (a) an adduct of 4 to 100 moles alkylene oxide, selected from the group consisting of ethylene oxide, propylene oxide or mixtures of both, with an at least trihydric aliphatic alcohol of 3 to 10 carbon atoms, and (b) acrylamide or methacrylamide.

2. A graft polymer according to claim 1, which polymer contains 2.5 to 50% by weight of the adduct and 50 to 97.5% by weight of grafted acrylamide or methacrylamide, based on the total graft polymer.

3. A graft polymer according to claim 1, which polymer contains 2.5 to 30% by weight of the adduct and 70 to 97.5 % by weight of the grafted acrylamide, based on the total graft polymer.

4. A graft polymer according to claim 1, which polymer contains 2.5 to 20% by weight of the adduct and 80 to 97.5% by weight of the grafted acrylamide, based on the total graft polymer.

5. A graft polymer according to claim 4, which polymer contains 90 to 97.5% by weight of the grafted acrylamide.

6. A graft polymer according to claim 1 obtained from an adduct of 4 to 100 moles of propylene oxide with a trihydric to hexahydric alkanol of 3 to 6 carbon atoms and acrylamide or methacrylamide.

7. A graft polymer according to claim 6 obtained from acrylamide and an adduct of 40 to 80 moles of propylene oxide with 1 mole of glycerol.

8. A graft polymer according to claim 7, which polymer contains 4 to 10% by weight of the adduct of 40 to 80 moles of propylene oxide with 1 mole of glycerol and 90 to 96% by weight of grafted acrylamide, based on the total graft polymer.

9. An aqueous formulation which contains, based on the entire formulation,
1 to 10% by weight of a graft polymer obtained from an adduct of an alkylene oxide with an at least trihydric alcohol of 3 to 10 carbon atoms and acrylamide or methacrylamide,
8 to 25% by weight of an alkylsulfonate containing 8 to 20 carbon atoms in the alkyl moiety, and
3 to 10% by weight of an adduct of 2 to 40 moles of ethylene oxide with 1 mole of a fatty alcohol or fatty acid, each containing 8 to 22 carbon atoms, or with 1 mole of an alkylphenol containing 4 to 12 carbon atoms in the alkyl moiety, and 65–88% by weight of water.

* * * * *